United States Patent Office 3,511,318
Patented May 12, 1970

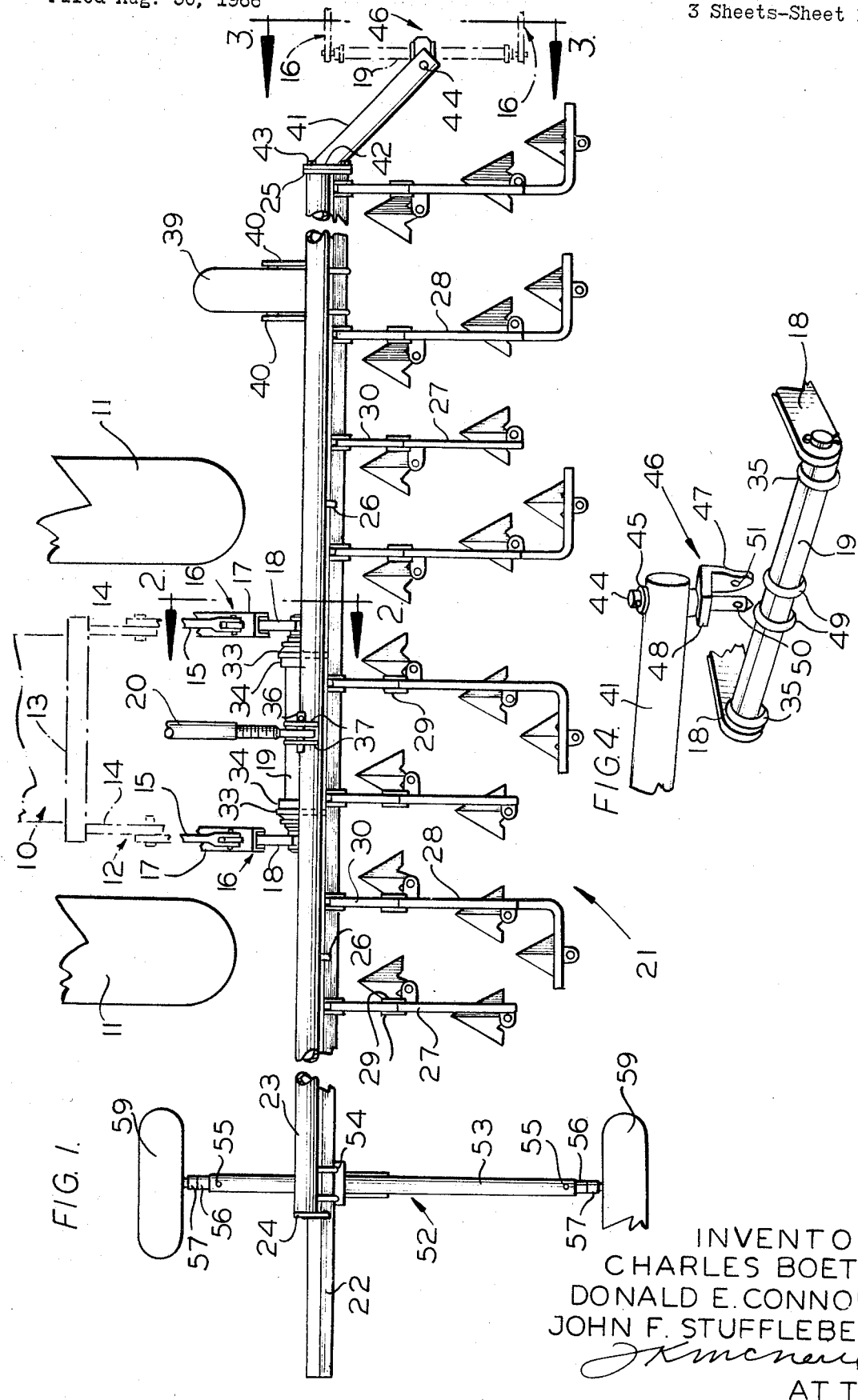

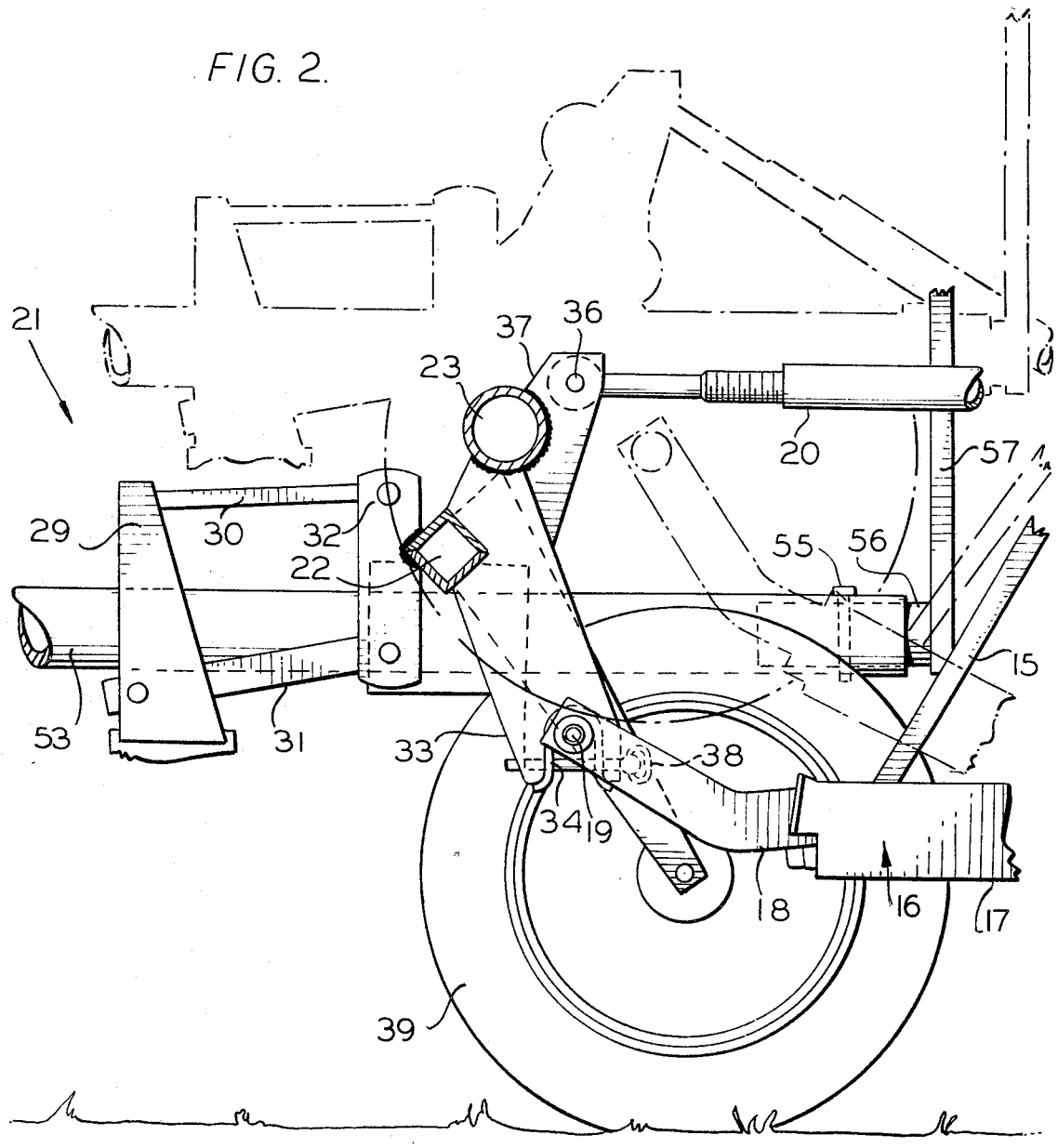

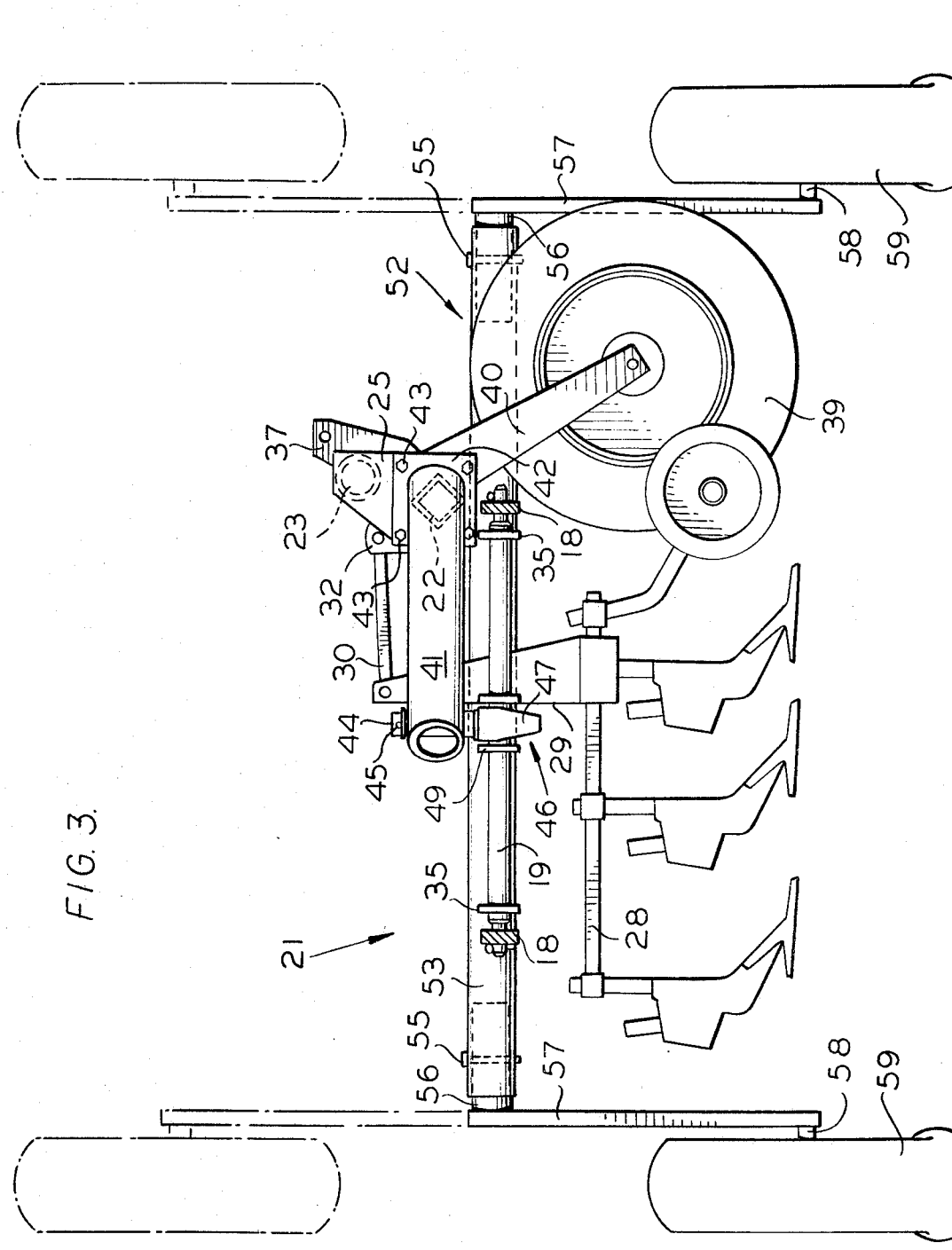

3,511,318
IMPLEMENT TRANSPORT ATTACHMENT
Charles Boetto, Naperville, Donald E. Connor, Plainfield, and John F. Stufflebeam, Lockport, Ill., assignors to International Harvester Company, Chicago, Ill., a corporation of Delaware
Filed Aug. 30, 1966, Ser. No. 576,153
Int. Cl. A01b 73/00
U.S. Cl. 172—240
1 Claim

ABSTRACT OF THE DISCLOSURE

An agricultural implement to be drawn by a tractor or the like, the implement comprising, a transverse tool-carrying frame, a first and second set of wheels connected to the frame, said second set of wheels being laterally spaced with respect to the longitudinal axis of the frame and movable to engage the ground to elevate the frame to an effective endwise transport position, and a first and second hitch to selectively connect the implement to the tractor for field operation or highway transport.

This invention relates to tractor attached implements and particularly to means facilitating the transportation of transversely elongated implements.

Implements such as cultivators, planters and the like that are substantially wider than the propelling vehicle require that special provision be made for transporting them over highways, through gates and the like, and this is usually accomplished by connecting the tractor to the implement to transport it endwise. While the problem is not new, the means previously utilized to permit such an implement to be transported endwise has required the expenditure of considerable time and labor. Therefore, the present invention has for its object the provision of improved attaching means for connecting an implement to a tractor perpendicular to the line of travel during operation and parallel to the line of travel for transportation through gates and the like.

Another object of the invention is the provision, in a tractor mounted laterally elongated implement, of improved attaching means for quickly converting the implement from operation to endwise transport.

Other objects and advantages of the invention will become clear from the following detailed description when read in conjunction with the accompanying drawings wherein:

FIG. 1 is a plan view with parts removed of a tractor-mounted cultivator and tractor hitch assembly incorporating the features of this invention;

FIG. 2 is an enlarged view of the implement and hitch structure in side elevation and with parts removed;

FIG. 3 is a sectional view taken on the line 3—3 of FIG. 1; and

FIG. 4 is a perspective view of a detail, with the parts separated, of a portion of the structure shown in FIG. 1.

In the drawings the numeral 10 designates a tractor 10 having rear wheels 11 and a power lifted hitch structure 12 including a power operated rockshaft 13 having lift arms 14 affixed thereto connected by generally vertically extending lifting links 15 to a pair of laterally spaced hitch links 16.

Hitch links 16 are pivotally connected at their forward ends to the tractor by means, not shown, accommodating vertical swinging movement of the links in response to rocking of shaft 13. Each link 16 comprises a socket member 17 and a beam member 18 slidably received in the socket member and releasably locked therein by means not shown. The rear ends of beam 18 are bent upwardly and connected by a transverse drawbar 19. An upper link 20 is also pivotally connected to the tractor and forms with links 16 a 3-point hitch system for the integral attachment to the tractor of an implement in the form of a cultivator 21.

Implement 21 comprises an elongated transversely extending tool bar 22, square in cross-section, braced by a parallel tubular member 23 affixed at its ends to bar 22 by lugs 24 and 25 and by additional and intermediate lugs 26.

Bar 22 and tubular member 23 constitute an implement supporting frame for a plurality of cultivator gangs 27 and 28. Although the kind of earthworking unit mounted on the frame forms no part of the invention, the invention being equally applicable to a supporting frame carrying planter units, it may be understood that each of the gangs 27 and 28 is secured to the lower end of a standard 29 which is connected to vertically spaced generally parallel links 30 and 31, the forward ends of which are pivotally connected to a bracket 32 affixed to tool bar 22.

The cultivator 21 is adapted to be integrally connected to the tractor 10 through the intermediary of the hitch structure 12; that is, the implement is propelled over the ground during operation by the draft transmitted through hitch 12, and rocking of shaft 13 on the tractor to lift the hitch structure is adapted to raise the implement above the ground to one of its transport positions for turning, as at the end of a field. The attachment of the implement to and detachment thereof from the tractor is made quickly and easily, and for this purpose the implement is provided with a pair of laterally spaced downwardly extending hitch brackets 33 affixed, as by welding, at their upper ends to tool bar 22 and tubular brace member 23. The lower end of each hitch bracket 33 is provided with a downwardly opening recess in the form of a socket 34 adapted to receive opposite ends of drawbar 19, end retainer rings 35 being secured to the bar to laterally position the hitch brackets 33. The rear end of upper link 20 is pivotally connected by a pin 36 to a pair of lugs 37 affixed to member 23. Drawbar 19 is retained against accidental displacement from sockets 34 by the provision of locking pins 38.

In FIG. 2 the position of the cultivator parts corresponds to the operating position of the implement. During operation the implement can be supported by a pair of gauge wheels 39, only one of which is shown, mounted at laterally spaced locations on the implement by arms 40 affixed to tool bar 22 and extending therefrom. The dotted line position of the parts shown in FIG. 2 corresponds to the raised position of the implement for crossing waterways, turning at the ends of a field, and the like.

In order to transport the implement through gates, along highways and the like, the implement is disconnected from the tractor, and this is accomplished quickly and easily by removing pins 36 and 38 and lowering the draft links 16 by power from the tractor. This releases drawbar 19 from the sockets 34 so that the tractor can be driven away. The drawbar 19 remains as a part of the tractor hitch structure and the tractor is backed up to the right-hand end of the implement as viewed in FIG. 1 for endwise connection of the implement thereto.

Forming a part of the implement is a tubular transport hitch member 41 provided at one end with a flange 42 secured to end plate 25 by bolts 43.

Transport hitch member 41 is angled rearwardly with respect to tool bar 22, and is apertured at its end to receive a vertically extending pin 44 retained by a cotter 45, and forming a part of a second socket means 46 which also includes a socket element 47 having a right angled portion 48 mounted on pin 44. Second socket means 46 is adapted to receive the central portion of drawbar 19 between a pair of centrally disposed positioning rings 49, upon operating the power lift means of the tractor to raise the hitch structure 12 and drawbar 19 to seat the drawbar in the socket. The lower ends of pin 44 and socket element 47 are provided with registering openings 50 and 51 to receive pin means, not shown, such as one of the pins 38, to prevent displacement of drawbar 19 from the socket means 46.

In order to support the rear portion of the implement during endwise transport, a transport wheel unit 52 is mounted thereon near one end and comprises a tubular member 53 secured by a clamp 54 to tool bar 22 and having apertures in its ends to receive pins 55. Each end of the tube slidably receives a stub shaft 56 having affixed to the outer end thereof a crank arm 57 to the other end of which is secured a stub axle 58 upon which is mounted a wheel 59.

Shaft 56 is provided with an aperture registering with the aperture in member 53 to receive pin 55 and lock the wheels in the endwise transport position shown in solid lines in FIG. 3 and optionally, by swinging the arms 57 through 180°, to the position the wheels occupy during operation of the implement.

The novel hitch mechanism of this invention permits quick attachment of the implement to the tractor in integral relation to control the implement during operation and to raise it above the ground when turning, and the like, and quick detachment of the implement from the tractor and conversion of the implement position by providing quick attaching means at one end of the implement for connection to the tractor in trailing relation for traveling over highways, through gates and the like, and again quick detachment of the implement from the tractor. Thus, the first socket means 34 opens downwardly so that a connection thereof to the tractor drawbar 19 is made by simply utilizing the tractor power lift to raise the hitch structure 16 in order to seat drawbar 19 in the laterally spaced sockets 34. Upon connection of the upper link 20 to lug 37 the implement can then be elevated above the ground. Locking pin 38 prevents displacement of the drawbar 19 from the socket 34, and detachment of the implement from the tractor is quickly accomplished simply by raising machine placing wheels 59 in down position and removing pins 38 and lowering the hitch structure 16. The tractor is then driven to the end of the implement adjacent to the transport hitch member 41 and backed up until drawbar 19 is disposed below second socket member 46, whereupon the drawbar 19 is lifted by raising hitch 16 until the central portion of the drawbar, between rings 49, which serve as guide means as well as lateral limiting means, is seated between the elements 44 and 47 of the socket means 46. In this position the wheel arms 57 have been swung downwardly to the solid line position shown in FIG. 3, and when the implement is again to be operated, pins 55 are removed and arms 57 carrying wheels 59 are swung upwardly to the dotted line position of FIG. 3 and pins 55 reinserted.

What is claimed is:
1. For use with a tractor having power lift means thereon and hitch means including laterally spaced members having a transverse hitch bar thereon and operatively connected to said lift means for raising and lowering the hitch means, the combination of an implement having a transversely extending tool-carrying frame, a first hitch member provided for field operation having laterally spaced downwardly opening first socket means carried by the forward portion of said frame to slidably receive said transverse hitch bar upon raising said hitch means, means forming an integral connection between said forward portion of the implement frame and the tractor to accommodate lifting said implement frame upon further lifting of said hitch means, first laterally spaced supporting wheel means mounted on said frame on axes parallel to the longitudinal axis of the frame and adapted to support said implement in its operating position, second supporting wheel means mounted on said frame near one end thereof laterally spaced with respect to the longitudinal axis of the frame and vertically movable, upon lifting said frame, from an elevated position to a lowered position to support said one end of the frame and to elevate the frame to an effective endwise transport position, a second hitch member for transport of said frame affixed to the other end of said frame including vertical pivot means having downwardly opening second socket means mounted thereon to accommodate lateral swinging of the implement relative to the tractor, said transverse hitch bar being releasable from said first socket means upon lowering said tractor hitch means, and said transverse hitch bar being optionally receivable upon lifting thereof in said second socket means in said second hitch member to accommodate endwise transportation of said implement.

References Cited

UNITED STATES PATENTS

| Re. 24,415 | 1/1958 | Oehler et al. | 172—272 X |
| 2,109,098 | 2/1938 | Baxter | 172—240 X |
| 2,762,140 | 9/1956 | Elfes | 172—240 X |
| 3,162,459 | 12/1964 | Marmorine et al. | 280—34.1 |
| 2,621,458 | 12/1952 | Douyard | 172—240 |

FOREIGN PATENTS

| 740,701 | 10/1950 | Germany. |
| 691,526 | 5/1953 | Great Britain. |
| 1,191,619 | 4/1965 | Germany. |

ROBERT E. PULFREY, Primary Examiner

A. E. KOPECKI, Assistant Examiner

U.S. Cl. X.R.

172—248